J. P. MEYER.
WINDOW CLEANING DEVICE.
APPLICATION FILED OCT. 29, 1919.

1,409,055.

Patented Mar. 7, 1922.

INVENTOR
John P. Meyer
BY
Alfred Schickel
ATTORNEY

UNITED STATES PATENT OFFICE.

JOHN P. MEYER, OF WEST HOBOKEN, NEW JERSEY.

WINDOW-CLEANING DEVICE.

1,409,055.  Specification of Letters Patent.  Patented Mar. 7, 1922.

Application filed October 29, 1919. Serial No. 334,246.

*To all whom it may concern:*

Be it known that I, JOHN P. MEYER, a citizen of the United States, residing at West Hoboken, county of Hudson, and State of New Jersey, have invented certain new and useful Improvements in Window-Cleaning Devices, of which the following is a specification.

This invention relates to a rain or snow remover for car windows, being intended more particularly for application to the end window or windows in front of the motorman, and it has for an object to enable the motorman or engineer to easily keep the window clear of sight obstructing matter such as snow or rain.

A further object is to provide a device of simple construction by which the entire window can be cleaned in a moment by means operated from within the car vestibule.

For further comprehension of the invention, and of the objects and advantages thereof, reference will be had to the following description and accompanying drawings, and to the appended claims in which the various novel features of the invention are more particularly set forth.

Fig. 1 of the drawings is a side elevation of a snow and rain remover embodying the invention, showing it in operative position.

Figures 1, 2:
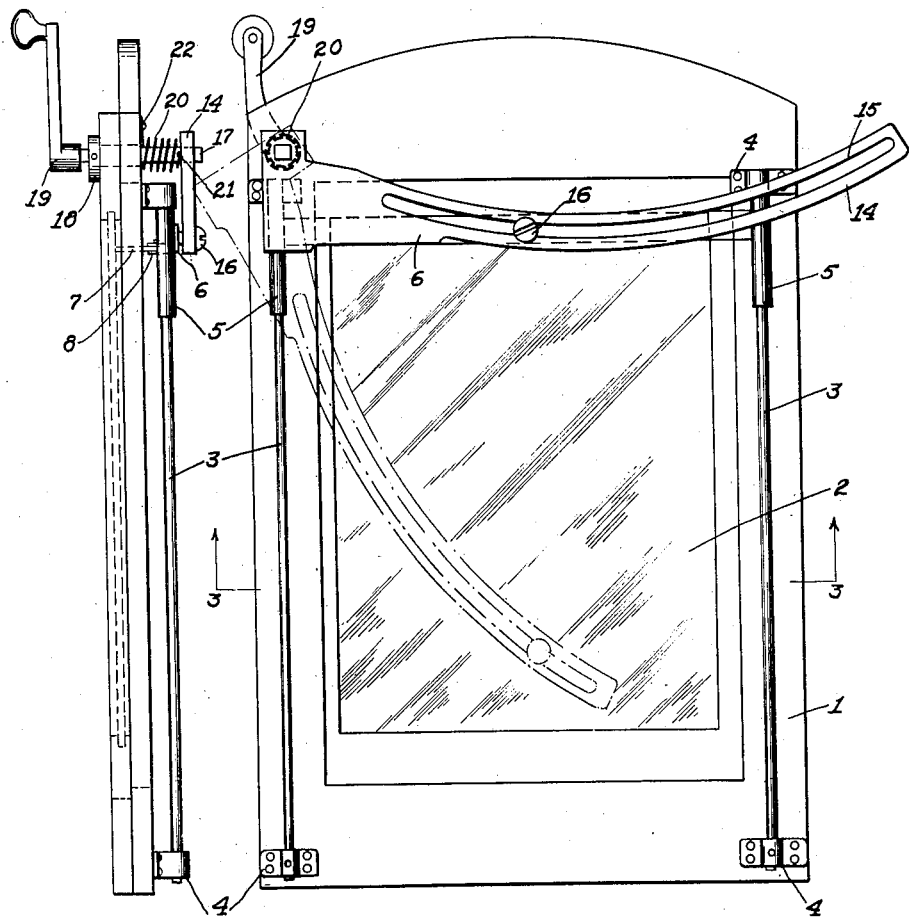
Fig. 2 is a front elevation thereof.
Figure 3:
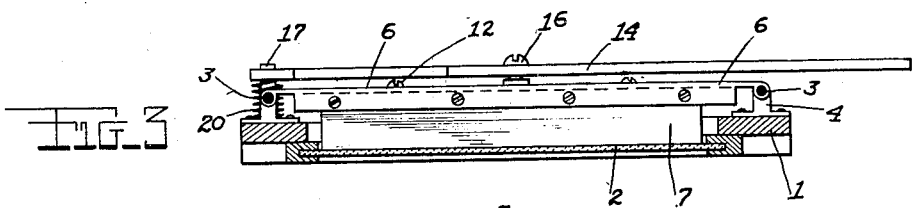
Fig. 3 is a horizontal sectional view on the line 3—3 of Fig. 2.
Figure 4:
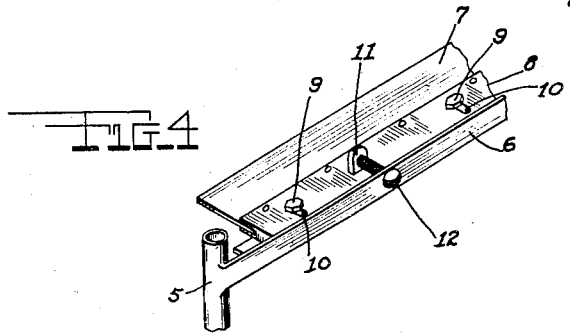
Fig. 4 is a fragmentary perspective view of the wiper element.

In the drawings 1 indicates the frame of an ordinary car vestibule window and 2 the window pane. A pair of vertical rods 3 are mounted upon opposite sides of the window frame and extending at opposite ends above and below the upper and lower edges of the window frame and are fixed at top and bottom in eyes 4 fixed to the frame, the rods being thus spread forwardly from the frame and forming guide rods for the wiper element.

These rods have slidably mounted thereon a pair of sleeves 5 which are rigidly united by the horizontal angle bar 6 which is fixed at the opposite ends thereto. Upon this bar 6 is mounted a wiper adapted to travel up and down the window as will be presently pointed out, this wiper comprising a rubber strip carried by and projecting inwardly from a flat bar 8 which rests upon and is secured to the angle bar 6. This bar 8 is preferably mounted to be adjustable toward and away from the window pane, being here shown as secured by bolts 9 passing through slots 10 therein and threaded into the angle bar 6. From this flat bar, ears 11 project upwardly and screws 12, which pass freely through suitable openings in the vertical flange of the angle-bar, are threaded through these ears.

The means by which the wiper element just described is moved vertically over the window pane comprises a curved arm 14 having a longitudinal slot 15 in which a headed pin 16, carried by the angle-bar 6 midway between its ends, engages. This arm is fixed at one end to a shaft 17, extending through and suitably journaled as by the bearing 18, in the window frame 1 at one of the upper corners thereof, this shaft having a crank handle 19 on its inner end. A coiled spring 20 encircles the shaft 17 between the arm 14 and the faces of the window frame, being fastened at opposite ends as at 21 and 22 to the arm and frame, this spring being of sufficient strength to return the wiper to raised position.

It is believed that the operation of the device will be readily understood from the foregoing description. The spring 20 normally holds the wiper in its uppermost position, when it is desired to clean the window the crank handle 19 is rotated, swinging arm 14 downward as indicated in dotted lines in Fig. 2, the latter moving the angle-bar 6 which carries the wiper 7 downward also, the sleeves 5 sliding on the rods 3 and serving to guide the wiper and prevent it from turning. As will be obvious I have provided a simple and easily operated device by means of which the entire area of the window can be cleaned in an instant as often as desired, this device being also applicable to the windows of engine cabs, the windshields of automobiles or to any other vehicles.

Having thus described my invention what I claim as new and desire to secure by Letters Patent of the United States is as follows:

A window cleaning device of the class described comprising a pair of vertical rods adapted to be mounted upon opposite sides of a window pane, a pair of sleeves slidably mounted on said rods, a horizontal angle bar for uniting said pair of sleeves, a flat bar carrying a rubber wiper on said angle bar, said flat bar being adjustable towards and away from the window, means for effecting this adjustment, a curved and longitudinally slotted arm pivotally secured at one of its ends to the window frame, a headed pin carried by said angle bar traveling in the slot of said arm, operating means for imparting to said arm a downward motion for moving the angle bar carrying said wiper over the window pane while said sleeves are traveling along said pair of vertical rods, and means for automatically returning the wiper into its original position after each operation substantially as described and for the purpose set forth.

In testimony whereof I have affixed my signature.

JOHN P. MEYER.